United States Patent [19]

Hare

[11] Patent Number: 4,773,953

[45] Date of Patent: Sep. 27, 1988

[54] METHOD FOR APPLYING A CREATIVE DESIGN TO A FABRIC FROM A SINGAPORE DAMMAR RESIN COATED TRANSFER SHEET

[76] Inventor: Donald S. Hare, 4 Lexington Ave., New York, N.Y. 10010

[21] Appl. No.: 819,605

[22] Filed: Jan. 17, 1986

Related U.S. Application Data

[63] Continuation-in-part of Ser. No. 703,529, Feb. 20, 1985, abandoned.

[51] Int. Cl.[4] .......................... B05D 1/14; B05D 1/36; B44C 1/17; B32B 31/00

[52] U.S. Cl. .................................... 156/240; 156/249; 156/277; 156/289; 400/65; 428/200; 428/202; 428/914

[58] Field of Search ............... 428/200, 202, 913, 914, 428/915, 40, 41, 42; 156/230, 240, 239, 247, 249, 277, 289, 241; 400/83, 65, 110; 340/747

[56] References Cited

U.S. PATENT DOCUMENTS

| | | | |
|---|---|---|---|
| 3,095,649 | 7/1963 | Wightwick | 156/240 |
| 3,578,525 | 5/1971 | Mueller | 156/240 |
| 4,038,123 | 7/1977 | Sammis | 156/240 |
| 4,142,929 | 3/1979 | Otomine et al. | 156/230 |
| 4,216,286 | 8/1980 | Greene et al. | 156/240 |
| 4,224,358 | 9/1980 | Hare | 156/235 |
| 4,235,657 | 11/1980 | Greenman et al. | 428/413 |
| 4,269,650 | 5/1981 | Arai et al. | 156/230 |
| 4,284,456 | 8/1981 | Hare | 156/240 |
| 4,440,589 | 4/1984 | Lock | 156/235 |
| 4,544,590 | 10/1985 | Egan | 156/241 |

OTHER PUBLICATIONS

WO 83/01019; Hubbard, Karl E.; 31 Mar. 1983.

*Primary Examiner*—Michael Ball
*Assistant Examiner*—Louis Falasco
*Attorney, Agent, or Firm*—Birch, Stewart, Kolasch & Birch

[57] ABSTRACT

A method for creating personalized, creative designs or images on a fabric such as a tee shirt or the like using a personal computer system. The design is first created by hand on the monitor screen of the computer system. The design so created is then printed onto a heat transfer sheet. The design is then ironed onto the fabric or tee shirt. The design may also be an image, such as a picture created by a video camera.

13 Claims, 2 Drawing Sheets

METHOD FOR APPLYING A CREATIVE DESIGN TO A FABRIC FROM A SINGAPORE DAMMAR RESIN COATED TRANSFER SHEET

BACKGROUND OF THE INVENTION

This application is a continuation-in-part of U.S. application Ser. No. 703,529, filed Feb. 20, 1985 now abandoned.

The present invention relates to a method for utilizing a personal computer, a video camera or the like to create graphics, images or creative designs on a fabric. More specifically, the present invention relates to a method of creating graphics, images or other creative designs on the face of a cathode ray tube (or within a video camera) and transferring those graphics, images or designs to a fabric such as a tee shirt or the like.

In recent years, tee shirts with a variety of designs thereon have become very popular. A large number of tee shirts are sold with pre-printed designs to suit the various tastes of consumers. In addition, many customized tee shirt parlors have sprung up, particularly in resort areas, which permit customers to select designs of their choice. Processes have also been proposed for permitting customers to create their own designs on transfer sheets for application to tee shirts by use of a conventional iron, such as described in U.S. Pat. No. 4,244,358, issued Sept. 23, 1980, to the present inventor.

Simultaneous with the development of the tee shirt rage, there is a growing popularity for equipment and processes for creatng personalized graphics or designs on the visual monitor of a computer system or television screen. Many products are available for permitting such graphics or designs to be put on these screens, such as the "Koala Pad Touch Tablet", manufactured by Koala Technologies of Santa Clara, Calif. Another well-known form of device for creating personalized graphics and transferring them to the screen of a computer is the "mouse". Graphics can also be created using the well-known "joy stick", keys from a conventional keyboard, light pens and simply by moving one's finger over the touch-sensitive monitor screen.

The use of video cameras by the movie or home photographer has also become quite popular. The cost of these video cameras has been dropping to make them readily available to a large number of consumers.

SUMMARY OF THE INVENTION

It is a primary object of the present invention to provide a method which will attract the interest of consumer groups which are already captivated by the tee shirt rage described above; as well as the creative graphics rage utilized in connection with personal computer systems; and the wide-spread use of video cameras.

Accordingly, it is an object of the present invention to provide a method permitting the creation of personalized designs, images or graphics on a visual monitor or within a video camera; printing of the designs, images or graphics so created on a transfer sheet with the aid of a computer printer; and ironing of the personalized designs or graphics on the transfer sheet onto a conventional tee shirt or other fabric.

It is a further object of the present invention to provide a method which enlarges the present uses of graphic techniques developed for personal computers.

It is another object of the present invention to provide an improved transfer sheet which is receptive to the inks used in computer printers.

It is still another object of the present invention to provide a method which creates a more entertaining way to make one's own personalized tee shirt than known heretofore, through conventional, manual operations.

It is yet another object of the present invention to provide a new form of entertainment for personal computers.

It is still another object of the present invention to provide a method which can be practiced in a coin-operated, arcade environment to permit customers to electronically create their own personalized tee shirts through a coin-operated computer system containing the required graphics capabilities.

The objects of the present invention are fulfilled by providing a method for applying a creative design, image or graphics to a fabric or a shirt, or the like, comprising the steps of:

(a) electronically generating said image;

(b) electronically transferring said image to a printer;

(c) printing said image with the aid of said printer on an obverse surface of a transfer sheet, said transfer sheet including a substrate with a first coating thereon transferable therefrom to said fabric by the application of heat or pressure, and a second coating on said first coating, said second coating defining said obverse face and consisting essentially of Singapore Dammar Resin;

(d) positioning the obverse surface of said transfer sheet against said fabric; and (e) applying energy to the rear of said transfer sheet to transfer said image to said fabric.

The image may be electronically generated by a video camera, so the image may be a picture of one self or a family member, which may be printed on a fabric.

The steps of electronically generating the creative design may also be performed by manually manipulating a cursor across the screen of a visual monitor to create the design, the pattern of movement of the cursor being stored in the memory of an associated personal computer, to enable the pattern to be displayed on the cathode ray tube thereof.

The electronic manipulation of the cursor may be performed on a "Koala Pad", by a "mouse", "joystick", keys on a keyboard, light pen, or by moving one's finger across a touch-sensitive, monitor screen.

The printer utilized may be a multi-color printer or one that simply prints black on white. In the latter case, the creative design would comprise only the outline or shapes of objects and color could be added directly to the transfer sheet following printing by the operator, by the use of heat-transferable, color crayons, such as ordinary wax crayons (e.g. crayola), permanent markers, or oil-base paints.

If a message is to be included in the creative design, such as a word of the alphabet, software may be provided within the personal computer which permits the image created on the screen to be horizontally reversed. The reversed image would then be transferred to the printer and printed in reverse form onto the transfer sheet. One could then simply iron from the back of the transfer sheet and transfer the original, unreversed image from the screen directly onto the fabric of the tee shirt or the like.

BRIEF DESCRIPTION OF THE DRAWINGS

The present invention will become more fully understood from the detailed description given hereinbelow, and the accompanying drawings which are given by way of illustration only, and thus are not limitative of the present invention, and wherein:

FIG. 4 illustrates the step of ironing the design created on the transfer sheet onto a tee shirt or the like.

DETAILED DESCRIPTION OF PREFERRED EMBODIMENTS

Figure 1:
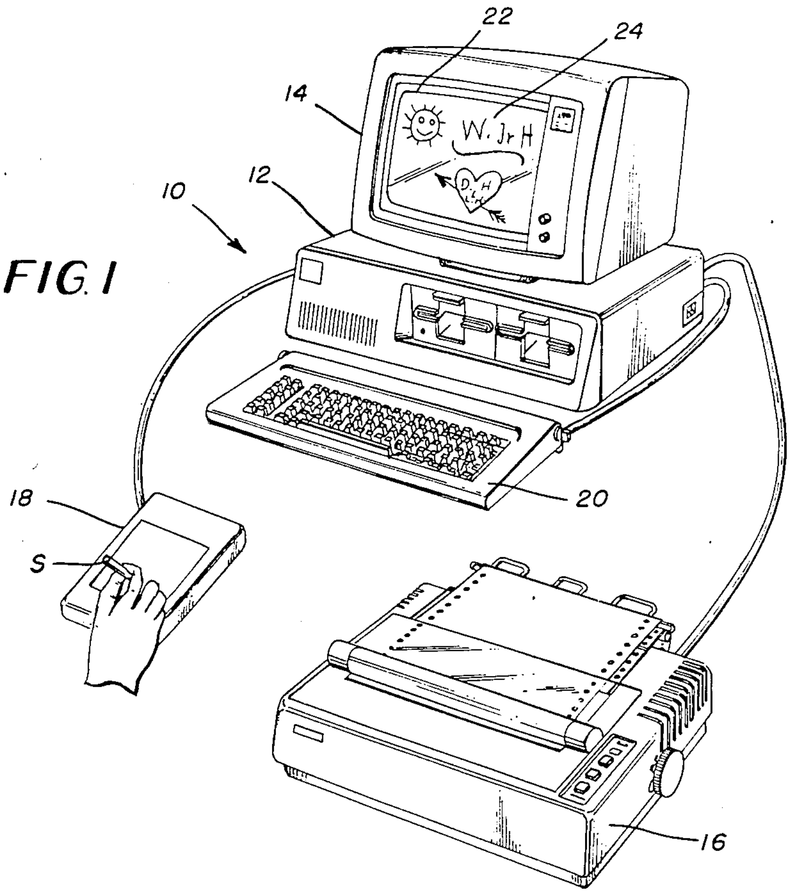
FIG. 1 is a diagrammatic illustration of an exemplary personal computer system which might be used for practicing the method of the present invention.

Referring in detail to FIG. 1, there is generally illustrated a personal computer system which may be utilized for practicing the method of the present invention. This computer system is generally illustrated 10, and includes a central processing unit (CPU) 12 of any commercially-available type such as an (IBM PC), an (Apple, McIntosh PC), or any other suitable type. The computer system further includes a monitor 14 having a display screen 22, a keyboard 20, and a matrix/graphics printer 16. Printer 16 may be any commercially-available printer, and in a preferred embodiment is a ("Okimate 10"), manufactured by Okidata Company, which is capable of printing graphics in approximately twenty-six colors. The computer system 10 further includes a graphics input pad 18 such as a ("Koala Pad Touch Tablet") manufactured by Koala Technologies. This graphics input pad permits one to create, by hand, any desired pattern on the pad by means of a stylus "S" and the pattern so created on the pad is electronically transferred through an appropriate cable to the screen of monitor 14 through the CPU 12.

As further illustrated in FIG. 1, the creative design or pattern being created on graphics input pad 18 is the design 24 illustrated on screen 22, including an illustration of a smiling sun in the upper left-hand corner of the screen, the message "W. Jr. H.S." in the upper right-hand corner, and a heart with an arrow through it bearing appropriate initials. This design 24 is illustrated in more detail in the enlarged view of FIG. 2.

It should be understood that this design 24 can be created on screen 22 by various means other than the graphics input pad 18. For example, it could be created by use of a well-known "mouse" which is also electrically coupled to the CPU 12; a "joy stick" electrically coupled to the CPU 12; by means of keys on the keyboard 20; a hand-held light pen which is moved across the face of screen 22; or screen 22 may be a touch-sensitive screen so that a pattern may be created thereon by movement of one's finger across the screen.

In the preferred embodiment where the (Koala graphics input pad) is utilized, this device has the capability of selecting colors for portions of the pattern created. For example, if the outline of the sun with the face is to be orange, an appropriate color selection key would be actuated in the control portion of pad 18. Likewise, the internal portion of the sun symbol could be colored a solid yellow, and the background around the sun could be colored sky blue. Or course, the colors selected by pad 18 would be appropriately displayed in those colors on the screen 22 and the same color selection information would be transferred to the printer 16 so that the final image printed on transfer paper 50, to be described hereinafter, would be printed thereon in inks of the selected colors for the corresponding portions of the design or pattern.

In an alternative embodiment, it may be desirable to merely draw the outline in black and white of the pattern 24, print the same on transfer sheet 50 with the aid of printer 16, and then hand-color the transfer sheet 50 with heat-transferrable, colored crayons. such as ordinary wax crayons (e.g. CRAYOLA), permanent markers, or oil paints which then become transferable with heat, to achieve a transfer pattern of a desired color distribution.

Figure 2:
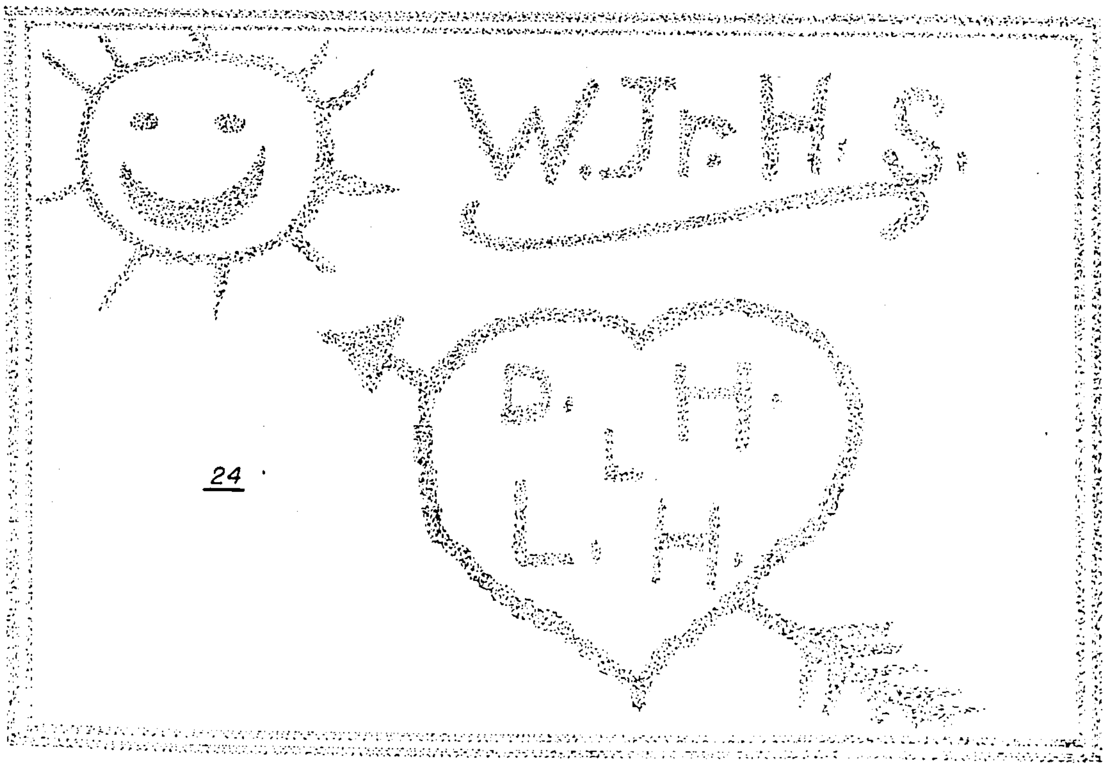
FIG. 2 is an enlarged view of the exemplary, personalized, creative design illustrated on the monitor screen in the system of FIG. 1.
Figure 3:
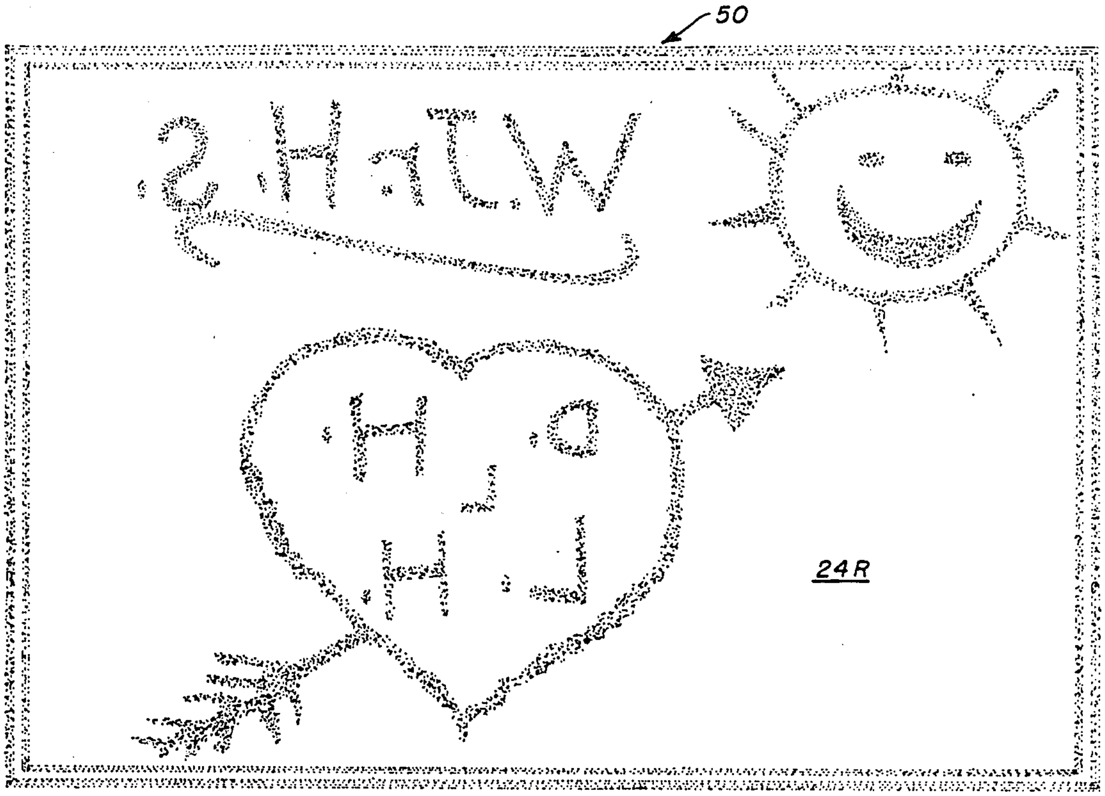
FIG. 3 illustrates a transfer sheet printed with the design created on the screen of FIG. 1 with the message thereon horizontally reversed.

When it is desired to create an alphabetical message, such as "W. Jr. H.S.", as part of the design 24, it is necessary to have some means of reversing the image from left to right within the CPU 12 before it is printed onto the transfer sheet 50 by the printer 16. This is best illustrated by the combination of the illustrations in FIGS. 2 and 3. FIG. 2 shows the image of the design 24 as it appears on screen 22 of monitor 14 and FIG. 3 shows the design 24 as it would be printed as a reverse image on transfer sheet 50. The purpose of reversing the image from left to right, or vice versa, is so that when one applies a source of heat energy, such as from an iron, to the backside 50A of transfer sheet 50, the image which is transferred to a tee shirt or fabric 62 is the reverse image of that of FIG. 3, which corresponds to the same image that was originally created on screen 22 of monitor 14. This horizontal flip or image reversal within the CPU 12 may be easily accomplished by commercially-available software to make it possible to create alphabetical messages on the surface of fabrics without writing the message backwards initially, such as by means of stylus "S" on the graphic input pad 18.

Figure 4:
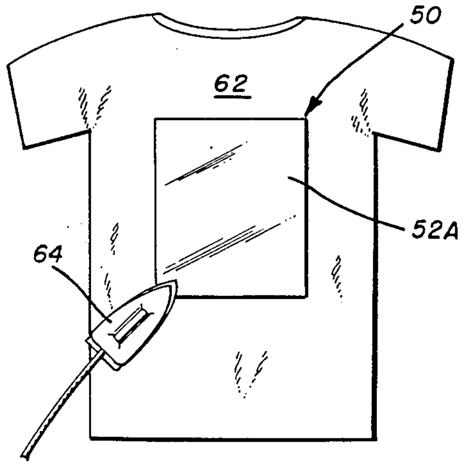

FIG. 4 illustrates how the final step of heat transfer from transfer sheet 50 to a tee shirt or fabric 62 is performed. The tee shirt 62 is laid flat, as illustrated, on an appropriate support surface,and the iron 64 is run and pressed across the back 52A of transfer sheet 50.

Figure 5:
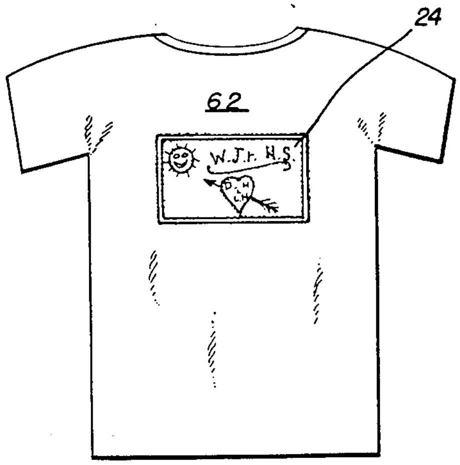
FIG. 5 is an illustration of the final design as it would appear on a tee shirt.

If the pattern being transferred is design 24, as illustrate on screen 22 of monitor 14, the resulting pattern on the tee shirt 62 is illustrated in FIG. 5. As stated hereinbefore, the design 24 may be appropriately colored, either be preselection of colors, by use of the graphics input pad 18 and the associated controls in conjunction with the multi-color printing capability of printer 16, or the colors of design 24 on tee shirts 62 may be the result of hand-coloring a black and white outline which was printed on transfer sheet 50.

Transfer sheet 50 in a preferred embodiment comprises, in part, a transfer paper manufactured by Kimberly-Clark Corporation under the trademark ("TransEZE"). Any other commercially-available transfer sheet may be utilized which has a substrate with a coating which is transferable to a receptor sheet upon the application of heat or pressure to the back of the substrate. It is a discovery of the present invention, however, that the transferabl coating of "TRANSEEZE", and other commercially-available transfer sheets, are not sufficiently receptive, or absorbent with respect to either the inks normally used in computer-type printers or ordinary wax crayons (e.g. CRAYOLA) to facilitate the printing/coloring of a good quality, clearly recognizable image on the transfer sheet and the subsequent transfer of the image to a fabric. This problem has been solved in accordance with the present invention by coating the transferable layer of conventional transfer sheets with an overcoating of Singapore Dammar Resin in a manner described in the following example.

Example

The transfer layer of a transfer sheet, comprised of latex saturated paper with a polymer coating of polyethylene base, such as ("TRANS-EZE") manufactured by Kimberly-Clark Corporation, may be spray-coated or applied via commercial offset or litho printers with Singapore Dammar Resin. The entire transfer sheet, including the substrate, heat transferable coating and Singapore Dammar Resin, may then be run through a hot air drier to remove tackiness. This will permit stacking and slip-sheeting of the resulting products.

The Singapore Dammar Resin overcoat of the transfer sheet has been found by the present inventor to exhibit excellent receptivity and non-smudge characteristics with respect to a wide variety of commercially-available printing inks utilized in state-of-the-art computer printers. The transfer sheet of the present invention has been successfully tested with the inks used in computer printers, such as the the (OKIMATE 10) by Okidata, and the (TOSHIBA 5400); thermal ribbon transfer printers using wax-based pigment inks on polyester ribbon substrates. Successful tests have also be performed using dot matrix printers with matrix inks or nylon ribbon, such as used in the entire line of (EPSON) and IBM printers.

Singapore Dammar Resin is also receptive to wax-based crayons, permanent markers, and oil paints, so it may be readily hand-colored as described hereinbefore.

The invention being thus described, it may be obvious that the same may be varied in many ways. Such variations are not to be recorded as a departure from the spirit and scope of the invention, and all such modifications as would be obvious to one skilled in the art are intended to be included within the scope of the following claims.

What is claimed is:

1. A method of applying an image to a fabric of a shirt or the like comprising the steps of:

(a) electronically generating said image;

(b) electronically transferring said image to a printer;

(c) printing said image with the aid of said printer on an obverse surface of a transfer sheet, said transfer sheet including a substrate with a first coating thereon transferable therefrom to said fabric by the application of energy, and a second coating on said first coating, said second coating defining said obverse face and consisting essentially of Singapore Dammar Resin;

(d) positioning the obverse surface of said transfer sheet against said fabric; and (e) applying energy to the rear of said transfer sheet to transfer said image to said fabric.

2. The method of claim 1, wherein said substrate and said first coating comprise a transfer paper manufactured by Kimberly-Clark Corporation under the trademark (TRANS-EZE).

3. The method of claim 1 wherein said image is electronically generated by a video camera.

4. The method of claim 1 wherein the step of electronically generating the image is performed by manually manipulating a cursor across the screen of a video monitor to create the image, the pattern of movement of the cursor being stored in a memory to enable the pattern to be displayed as an image on the monitor screen.

5. The method of claim 3, wherein the step of electronically transferring said image to a printer is performed by transferring the pattern in said memory to said printer.

6. The method of claim 5, wherein said printer prints said image on said transfer sheet in selected, multiple colors.

7. The method of claim 1, wherein said printer prints said image on said transfer sheet in selected, multiple colors.

8. The method of claim 1, wherein said printer prints an outline of said image on said transfer sheet and the outline of the image on said transfer sheet is selectively colored by hand with wax-based crayons.

9. The method of claim 1, wherein said energy is heat.

10. The method of claim 9, wherein said heat is manually applied by an iron.

11. The method of claim 1, wherein said energy is pressure.

12. The method of claim 1, including the further steps of electronically, horizontally reversing the image for printing by said printer.

13. The method of claim 4, wherein the manual manipulation of said cursor is performed by a "mouse" which is electrically coupled to said monitor.

* * * * *